United States Patent [19]

Walcott

[11] Patent Number: 4,899,186

[45] Date of Patent: Feb. 6, 1990

[54] IONOGRAPHIC DEVICE WITH PIN ARRAY CORONODE

[75] Inventor: Billy D. Walcott, Rochester, N.Y.

[73] Assignee: Xerox Corporation, Stamford, Conn.

[21] Appl. No.: 367,917

[22] Filed: Jun. 19, 1989

[51] Int. Cl.[4] .............................................. G01D 15/10
[52] U.S. Cl. ..................................... 346/159; 346/155
[58] Field of Search ...................... 346/150, 153.1, 158, 346/159, 155, 139 C

[56] References Cited

U.S. PATENT DOCUMENTS

| | | | |
|---|---|---|---|
| 3,623,123 | 11/1971 | Jvirblis | 346/74 ES |
| 3,765,027 | 10/1973 | Bresnick | 348/74 ES |
| 4,112,299 | 9/1978 | Davis | 250/326 |
| 4,357,618 | 11/1982 | Ragland | 346/159 |
| 4,408,214 | 10/1983 | Fotland et al. | 346/159 |
| 4,463,363 | 7/1984 | Gundlach et al. | 346/159 |
| 4,495,508 | 1/1985 | Tarumi et al. | 346/159 |
| 4,498,080 | 2/1985 | Honda et al. | 346/159 |
| 4,524,371 | 6/1985 | Sheridon et al. | 346/159 |
| 4,538,163 | 8/1985 | Sheridon | 346/155 |
| 4,558,334 | 12/1985 | Fotland | 346/159 |
| 4,584,592 | 4/1986 | Tuan et al. | 346/159 |
| 4,591,713 | 5/1986 | Gunolach et al. | 250/326 |
| 4,644,373 | 2/1987 | Sheridan et al. | 346/159 |
| 4,658,275 | 4/1987 | Fujii et al. | 346/154 |
| 4,697,196 | 9/1987 | Inaba et al. | 346/159 |
| 4,725,731 | 2/1988 | Lang | 250/326 |
| 4,737,805 | 4/1986 | Weisfield et al. | 346/159 |
| 4,794,254 | 12/1988 | Genovese et al. | 346/159 |

FOREIGN PATENT DOCUMENTS

| | | | |
|---|---|---|---|
| 743646 | 9/1966 | Canada | 346/154 |

*Primary Examiner*—Arthur G. Evans
*Attorney, Agent, or Firm*—Mark Costello

[57] ABSTRACT

An ion printing head is provided with a pin array coronde as an ion generation device, a corona controlling electrode and an array of modulation electrodes controlling the flow of ions to an imaging member in image-wise configuration. The pin array coronode provides an efficient and highly directable source of ions. At least part of the directability of the ions appears to be a result of the highly directionalized ion or corona wind, that tends to flow in a direction defined by the plane of the coronode. The corona wind also serves the purpose of removing corona effluents from the area adjacent the coronode that eventually cause deterioration of the head parts.

17 Claims, 1 Drawing Sheet

IONOGRAPHIC DEVICE WITH PIN ARRAY CORONODE

Figure 1A:
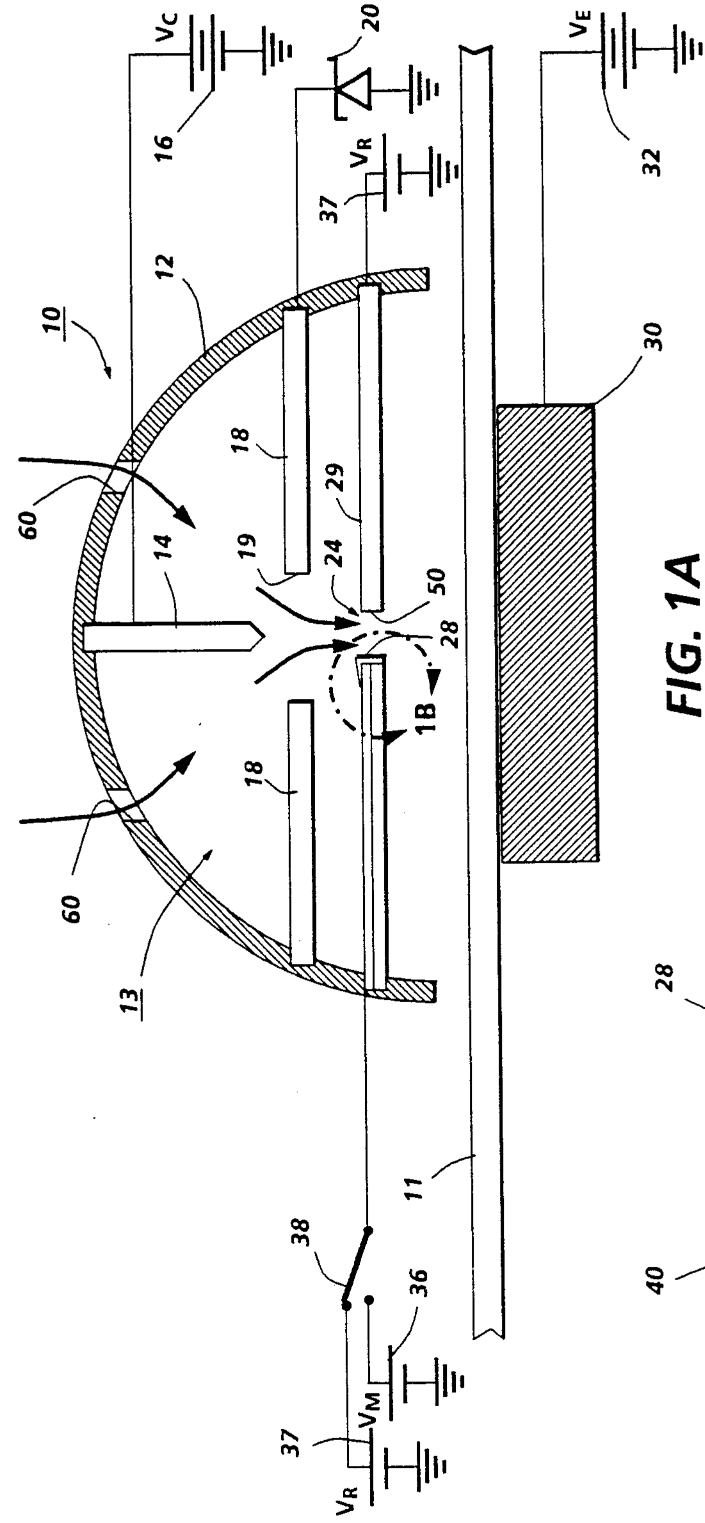

The present invention relates generally to ionographic printing devices, and more particularly to enhancement of the operation of an ion projection device by increasing the corona current available for the printing process.

INCORPORATION BY REFERENCE

US-A 4,524,371 to Sheridon et al., US-A 4,463,363 to Gundlach et al., US-A 4,538,163 to Sheridon, US-A 4,644,373 to Sheridon et al., US-A 4,737,805 to Weisfield et al. and US-A 4,112,299 to Davis

BACKGROUND OF THE INVENTION

In ionographic devices such as that described by US-A 4,524,371 to Sheridon et al. or US-A 4,463,363 to Gundlach et al., an ion producing device generates ions to be directed past a plurality of modulation electrodes to an imaging surface in imagewise configuration. In one class of ionographic devices, ions are produced at a coronode supported within an ion chamber, and a moving fluid stream entrains and carries ions produced at the coronode out of the chamber. At the chamber exit, a plurality of control electrodes or nibs are modulated with a control voltage to selectively control passage of ions through the chamber exit. Ions directed through the chamber exit are deposited on a charge retentive surface in imagewise configuration through control of the modulation electrodes to form an electrostatic latent image developable by electrostatographic techniques for subsequent transfer to a final substrate. The arrangement produces a high resolution non-contact printing system.

Corona efficiency in ionographic heads is very low, on the order of 0.1% to 0.5%, when efficiency is defined as the ratio of the current reaching the electroreceptor to the total current within the corona chamber. Space charge, which builds up within the ion chamber and the modulation channel, serves to quench the corona. This can be overcome by increasing air flow velocity through the head. One limitation on this method of improving corona efficiency is the increasing machine noise accompanying increased air flow. Dirt management and the high cost of the larger capacity air flow device are other problems. However, the air entrainment has been seen as required to provide a satisfactory source of corona current, and as a side benefit, assists in removing corona effluents and byproducts that tend to cause long term damage to the print head. Even with air entrainment of ions, images formed still have a low contrast or development voltage, which causes problems with the eventual development of the image. While a printhead requiring no additional air flow apparatus would be desirable, the problems recited are required to be overcome.

US-A 4,725,731 to Lang, shows, in a scoroton for xerographic processes where a substantial, uniform charge is to be deposited on a surface preparatory to imagewise discharge, that a pin array coronode, preferably comprising saw tooth member with an array of projections forming the teeth thereof, produces a relatively uniform, high corona current. It is also known that pin array coronodes produce a significant amount of highly directed corona wind. Corona wind refers to the occurrence of ionized air molecules acquiring a significant velocity, such that the momentum of the molecules carries them towards the surface to be charged.

Pin array coronode corotron and scorotron devices are well known, as shown for example in US-A 4,725,731 to Lang and 4,591,173 to Gundlach. Pin array coronodes are also known for use in certain ionographic-type printing devices, such as for example, US-A 3,623,123 to Jvirblis, which shows the use of a pin array in association with a controllable grid network for printing characters. US-A 3,765,027 to Bresnick shows the use of a single pin to print in association with a character mask. 4,357,618 to Ragland shows pins or stylii apparently contacting a charge retentive surface for image formation. By way of background, US-A 4,697,196 to Inaba et al., 4,408,214 to Fotland et al., 4,558,334 to Fotland, US-A 4,658,275 to Fujii et al. and Canada 743,646 to Fauble, all show ion printing devices with various ion generation arrangements. US-A 4,584,592 to Tuan et al. demonstrates a modulation arrangement for imagewise modulation. These references are specifically incorporated herein by reference.

SUMMARY OF THE INVENTION

In accordance with the invention there is provided an ion printing device using a pin array coronode to provide a greater corona current to an imaging surface, and to inherently provide a highly directionalized corona wind that tends to maintain ion flow in the desired direction, and serves to remove corona effluents from the area adjacent the coronode.

In accordance with one aspect of the invention, an ion printing head is provided with a pin array coronode as an ion generation device, a corona controlling electrode, and an array of modulation electrodes for controlling the flow of ions to an imaging member in imagewise configuration. Whereas a primary problem associated with certain prior ionographic printing device has been a lack of corona current, it has been determined that the pin array coronode provides a highly directable source of ions. At least part of the directability of the ions appears to be a result of the highly directionalized ion or corona wind, that tends to flow in a direction defined by the plane of the coronode. The corona wind also serves the purpose of removing corona effluents from the area adjacent the coronode that eventually cause deterioration of the head parts.

Figure 1B:
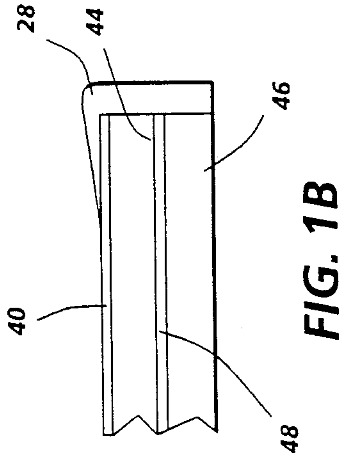

These and other aspects of the invention will become apparent fro the following description used to illustrate a preferred embodiment of the invention read in conjunction with the accompanying drawing in which:

FIGS. 1A and 1B schematically show an ionographic print head as contemplated by the present invention, in printing relationship with an imaging surface.

With reference now to the drawing where the showings are for the purpose of illustrating an embodiment of the invention and not for limiting same, FIG. 1 shows a schematic representation of a cross section of the marking head 10 of a ionographic marking apparatus for depositing charge on an charge receptor 11 (the imaging surface) in accordance with the invention.

Head 10 includes an support member or enclosure 12, which may be a non-conductive or insulating material, forming an ion generation region including an ion chamber 13. A pin array coronode 14 is supported within ion chamber 13, and is connected to a high potential source 16 driven to a voltage $V_C$, on the order of several thousand volts D.C., preferably negative, although a positive voltage may be possible. A corona inducing grid 18, preferably self-biased to a voltage level of between 800–1200 volts as controlled by one or more zener diodes 20, is provided between pin array coronode 14 and charge receptor 11 to cause corona production at the coronode 14 to start, and create an electric field generally in the direction of the imaging surface. A slit or slits 19 is provided through corona inducing grid 18 to allow the flow of ions therethrough.

Ions directed past grid 18 subsequently are directed through modulation channel 24 to come under the influence of accelerating back electrode 30 connected to a voltage source 32 held at a potential $V_E$ or ground. Charge receptor 11 moves over the back electrode 30 and collects ions upon its surface. Subsequently the latent image charge pattern may be made visible by suitable development apparatus (not shown).

Once ions enter modulation channel 24, it becomes necessary to render the ion-stream intelligible. This is accomplished by individually switching modulation electrodes 28, adjacent modulation channel 24, between a marking voltage source 36, held at $V_M$, and a reference potential 37 held at $V_R$, by means of switches 38. The modulation electrodes are arranged on a thin film layer 40 supported on a planar substrate 44. Reference potential $V_M$ is on the order of 100–500 volts higher than $V_R$, because the high corona currents produced by pin array electrode 14 requires a relatively high electric field intensity to modulate the ion stream.

The array of modulation electrodes 28 and an opposite wall 50 of reference member 29 form a slit opening through which ions are directed. The array of electrode 28 and the reference member 52 are arranged roughly parallel and opposite each other between grid 18 and charge receptor 11. Modulation electrodes 28 and the opposite wall 50, held at $V_R$, comprise a capacitor, across which the voltage potential of source 36, may be applied, when connected through switch 38. Thus, an electric field, extending in a direction transverse to the direction of the ion stream, is selectively established between a given modulation electrode 28 and the opposite wall 50. Reference potential $V_M$ is a relatively high voltage, on the order of 100–500 volts higher than $V_R$, because the high corona current produced by pin array electrode 14 requires a relatively high electric field intensity to modulate the ion stream. In one desirable embodiment, $V_R$ is held at 0 volts, or ground.

"Writing" of a selected spot is accomplished by connecting a modulation electrode to the reference potential source 37, held at $V_H$, so that the ion "beam", passing between the electrode and its opposite wall, will not be under the influence of a field therebetween and transport fluid exiting from the ion projector, in that "beam" zone, will carry the "writing" ions to accumulate on the desired spot of the image receptor sheet. Conversely, no "writing" will be effected when the modulation voltage is applied to an electrode. This is accomplished by connecting the modulation electrode 28 to the voltage source 36, via the switch 38 so as to impose upon the electrode a charge of the same sign as the ionic species. The ion "beam" will be repelled and be driven into contact with the opposite, conductive wall 50. Thus, an imagewise pattern of information is formed by selectively controlling each of the modulation electrodes on the marking array so that the ion "beams" associated therewith either exit or are inhibited from exiting the housing, as desired. For simplicity and economy of fabrication over the large area, full pagewidth head, thin film techniques are used. Thin film silicon, in either the amorphous, polycrystalline or microcrystalline forms, has been the material of choice for the active devices. The relatively low temperature of the amorphous silicon and polysilicon fabrication processes allows a large degree of freedom in the choice of substrate materials, enabling the use of inexpensive amorphous materials such as glass, ceramics and possibly some printed circuit board materials. The switches are desirably high voltage switching thin film transistors, which can handle the relatively high voltage differential of $V_M$ and $V_R$.

Coronode 14 is desirably a saw tooth pin array, with the pins formed by sharp, triangular projections, oriented with apexes extending towards the charge receptor 11 on center spacings of between about 2 and 3 mm. While a large number of materials may be used for the pin arrays, beryllium copper has been found to be a particularly satisfactory material, in that it is highly resistant to deterioration in the corona environment. Beryllium copper may be stamped into the desired array shape quite easily. It is a feature of the pin array coronode device that it produces a highly directionalized corona wind in comparison to wire coronodes, directed generally in the plane in which the array is supported. To enhance the corona wind, openings 60, which may be a variety of sizes and shapes, are formed in enclosure 12 to allow the flow of air therethrough. The flow of air is significant, and, as noted, flows generally along the plane in which the pin array is supported, and toward the charge receptor. The flow of air assists in increasing the efficiency of the device by entraining ions for flow through the modulation channel. Additionally, the flow of air tends to cause the removal of corona effluents from the head 10. It is also believed that the pin array coronode produces less ozone than standard wire coronodes. Numerous mechanical advantages are obtained by the use of the pin array coronode, including avoidance of coronode vibration, member strength, and ease of mounting.

Grid 18 tend to act in a manner similar to a scorotron screen. Accordingly, similar to the scorotron, the charge level deposited on the surface of charge receptor 11 can be controlled by increasing the voltage level to which grid 18 is self-biased by zener diodes 50, desirably to from about −500 to −1600 volts. It will be appreciated, of course, that grid 18 could be actively biased with a separate power supply.

The invention has been described with reference to a preferred embodiment. Obviously modifications will occur to others upon reading and understanding the specification taken together with the drawings. Various alternatives, modifications, variations or improvements may be made by those skilled in the art from this teaching which are intended to be encompassed by the following claims. 9n

I claim:

1. An ionographic imaging device, for depositing charge in imagewise configuration of an imaging surface moving in a process direction, comprising:

a support member;

a pin array coronode supported on the support member and positioned transverse to the process direction, having an array of projections directed towards the imaging surface, and coupled to a coronode power supply suitable to drive the coronode to a corona producing condition to produce a supply of ions directed toward the imaging surface;

a corona controlling grid member, supported on the support member, and arranged between the pin array coronode and the imaging surface, and biased to a selected grid voltage level, the grid member formed to provide an opening therethrough, through which ions generated at the pin array coronode pass;

an array of control electrodes supported on an array substrate and positioned transverse to the process direction, in generally parallel opposition to a conductive member, the substrate and the conductive member supported on the support member with respect to each other to form an ion modulation path therebetween, through which ions generated at the pin array coronode pass, each control electrode of the array connected to an imaging control power supply and individually biasable to a selected electrode voltage level with respect to a reference voltage, whereby the passage of ions through the ion modulation path, past the array of control electrodes to the imaging surface, is controlled.

2. The device as defined in claim 1, wherein the support member is an enclosure, provided with an opening adjacent to the imaging surface and at least one air flow inlet allowing the flow of air past the pin array coronode to enhance the corona wind created thereby.

3. The device as defined in claim 1, wherein the pin array coronode is a saw toothed member, and the projections have a generally triangular shape, with apexes thereof directed towards the imaging surface.

4. The device as defined in claim 3, wherein the pin array coronode is formed from beryllium copper.

5. The device as defined in claim 1, wherein the projections on the pin array coronode are provided at intervals of approximately 2-3 mm.

6. The device as defined in claim 1, wherein the grid member is self-biased to the selected voltage level.

7. The device as defined in claim 6, wherein the grid member is self-biased to the selected voltage level by providing at least one zener diode electrically connected between the grid member and a ground potential.

8. The device as defined in claim 1, wherein the grid member is biased to a voltage level between −400 to −1600 volts.

9. The device as defined in claim 1, wherein control electrodes area biased to a voltage level between approximately 0 and 500 volts, with respect to the reference voltage.

10. An ionographic print head, for depositing charge in imagewise configuration on an imaging surface moving in a process direction, comprising:

a enclosure member having a first opening adjacent to the imaging surface;

a pin array coronode supported within the enclosure member and positioned transverse to the process direction, having an array of triangular projections supported with the apexes thereof pointing towards the imaging surface, and coupled to a coronode power supply suitable to drive the coronode to a corona producing condition to produce a supply of ions directed toward the imaging surface;

a corona controlling grid member, supported on the enclosure member, and arranged between the pin array coronode and the imaging surface, and self-biased to a selected grid voltage level, the grid member formed to provide a slit opening therethrough, through which ions generated at the pin array coronode pass;

an array of control electrodes supported on an array substrate and positioned transverse to the process direction, in generally parallel opposition to a conductive member, the substrate and the conductive member supported within the enclosure member with respect to each other to form slit therebetween, through which ions generated at the pin array coronode pass, each control electrode of the array connected to an imaging control power supply and individually biasable thereby with respect to a reference voltage to control the passage of ions through the slit, past the array of control electrodes.

11. The device as defined in claim 10, wherein the enclosure provided member is formed to provide at least a second opening as an air flow inlet allowing the flow of air past the pin array coronode to enhance the corona wind created thereby.

12. The device as defined in claim 10, wherein the pin array coronode is a saw toothed member.

13. The device as defined in claim 10, wherein the pin array coronode is formed from beryllium copper.

14. The device as defined in claim 10, wherein the projection on the pin array coronode is provided at intervals of approximately 2-3 mm.

15. The device as defined in claim 10, wherein the grid member is self-biased to the selected voltage level by providing at least one zener diode electrically connected between the grid member and a ground potential.

16. The device as defined in claim 10, wherein the grid member is self-biased to a voltage level between −400 to −1600 volts.

17. The device as defined in claim 10, wherein control electrodes are biased to a voltage level between approximately 0 and 500 volts, with respect to the reference voltage and the amount of ions passing the electrodes decreases with increasing voltage levels.

* * * * *